United States Patent [19]

Archibald

[11] Patent Number: 4,645,191

[45] Date of Patent: Feb. 24, 1987

[54] VARIABLE SPEED CONVEYOR APPARATUS

[75] Inventor: David W. Archibald, Holywood, Northern Ireland

[73] Assignee: D.A.R. Tech Limited, Holywood, Northern Ireland

[21] Appl. No.: 764,054

[22] Filed: Aug. 9, 1985

[30] Foreign Application Priority Data

Aug. 22, 1984 [GB] United Kingdom ................. 8421291

[51] Int. Cl.$^4$ ............................................... B41L 1/32
[52] U.S. Cl. ....................................... 270/39; 198/792; 493/410; 493/423; 493/451
[58] Field of Search ...................................... 270/39–40; 493/409–410, 416, 423–424, 441–442, 451; 198/792, 581

[56] References Cited

U.S. PATENT DOCUMENTS

| | | | |
|---|---|---|---|
| 3,292,769 | 12/1966 | Zuppiger | 198/792 |
| 3,294,215 | 12/1966 | Walter | 198/792 |
| 3,599,777 | 8/1971 | Johnson | 198/792 |
| 3,917,250 | 11/1975 | Branicu | 270/39 |
| 4,227,606 | 10/1980 | Bogatzki | 198/792 |
| 4,284,191 | 8/1981 | Lavau | 198/792 |
| 4,408,755 | 10/1983 | Meier | 270/39 |
| 4,417,938 | 11/1983 | Sigl | 198/792 |
| 4,576,562 | 3/1986 | Anderson | 198/792 |

FOREIGN PATENT DOCUMENTS 736827 9/1955 United Kingdom ................ 198/792

Primary Examiner—E. H. Eickholt
Attorney, Agent, or Firm—Staas & Halsey

[57] ABSTRACT

A conveyor apparatus made up of a plurality of pairs of links which are pivotally interconnected and which are entrained around and co-operable with first and second index members to define an endless path. The index members move in synchronism at different speeds and guide means are provided to control movement of the links between the first and second indexing members. The differential speed of the indexing members results in the links moving at different speeds when on the two indexing members and this is made possible by the links pivoting so they close up with one another when on the slower moving of the two indexing members. The ability for the parts of the conveyor to move at different speeds is particularly useful for example in many types of manufacturing operations. One use of the apparatus is in arraying sheet material into a series of superimposed plies. For this purpose a plurality of rollers are provided to interconnect two of said endless chains. Thus, the rollers move in an endless path. Material is fed continuously between successive rollers when they are spaced apart forming loops which are subsequently formed into plies as the material is fed out of the rollers after they have closed up. The rollers are rotated in a direction opposite to the direction of movement of the endless path to achieve this.

9 Claims, 8 Drawing Figures

VARIABLE SPEED CONVEYOR APPARATUS

BACKGROUND OF THE INVENTION

The present invention relates to a variable speed conveyor apparatus, and more particularly to the precise handling of a variable speed chain and apparatus including such a chain.

In continuous production operations, or in performing operations of a repetitive nature on one or more articles in succession, it is convenient to have some form of conveyor and it is frequently necessary to transfer articles from one conveyor to another especially when certain operations have to be performed at different speeds compared with others.

An aim of the present invention is to provide a variable speed conveyor apparatus which is applicable for a number of uses according to different embodiments.

According to the present invention, there is provided a conveyor apparatus comprising a plurality of pairs of links, which are pivotally interconnected one with the other and which define an endless chain, first and second index members, and means carried by at least one link of each pair of links providing co-operating engagement with the first and second index members, the first and second index members defining an endless path along which the links are movable, means for driving the first and second members in timed relation, and respective guide means to control movement of the links from the first index member to the second index member, and from the latter to the former during conveyance around the endless path, the differential peripheral speeds of the first and second index members resulting in the links moving at differing speeds when on the two index members.

It is preferred that the first and second index members are rotatably driven and are in the form of wheels or sprockets with circumferentially spaced recesses for receiving pins interconnecting the links of the chain. The respective guide means for controlling movement of the links between the respective index members engage with the pins projecting from the links. The respective guide means control folding and unfolding of the links on their passage between the two index members. The links are arranged to be folded when on the first index member, i.e. with the ends of adjacent pairs of links lying adjacent one another and the links lying substantially side by side, and at least partially unfolded when on the second index member. A further guide may be employed to retain the pins in contact with the index members.

The apparatus may be utilised in any convenient orientation, but horizontal or vertical configurations are likely to have the most useful applications. The links can form carriers for work pieces on which operations are to be performed, for example, items requiring heat treatment.

In a more sophisticated application two sets of chain conveyor apparatus can be used in combination in spaced apart relation with a pair of links from each conveyor being interconnected by a carrier member. The carrier may be in the form of a roller which is rotatable and whose opposite ends form a pivotal connection for a respective pair of links from each chain. Such an apparatus makes use of the differential spacing and speed of the rollers as they are transferred from one index member to the other.

One application is in the handling of cloth where the apparatus may be employed to form a series of superimposed plies or folds in a length of sheet material such as cloth. To achieve this the rollers have to be rotated in a direction opposite to the direction of movement of the rollers around the endless path and at least one nip roller is required to ensure that cloth which is draped over a roller, prior to or during its transfer from co-operation with the second to the first index member to form a downwardly depending loop, is compressed with preceding loops and encouraged to be fed out from the roller path and so deposit each said loop outside the path of the rollers beneath the loop immediately preceding it.

Thus, according to another aspect of the present invention there is provided apparatus for arranging sheet material into a series of superimposed plies or folds, comprising a plurality of mutually spaced horizontal, elongate rollers arranged to describe an endless path, means carrying the rollers on said endless path comprising spaced apart chains defined by pairs of links connected one with another and entrained around and co-operating with respective first and second index members which are rotatable in synchronism at different peripheral speeds, and guide means for transferring the rollers between the index members at respective 'in feed' and 'off load' stations, which guide means control the folding and unfolding of the links carrying the rollers, whereby the roller being transferred from the second to first index member at the 'in feed' station undergoes a marked change in direction and closes on the roller which had preceded it through the marked change in direction, means for rotating at least some of the rollers on the first index member in a direction opposite to the direction of movement of the rollers on the endless path after the roller has undergone the marked change of direction, which change in direction and the rotation of the rollers acts to control an air pocket formed between the layer of material about to be made into a loop and a previously formed ply to help make this loop, by closing each open loop, and feeding the closed loops successively out from the roller path and depositing each said loop outside the path of the rollers beneath the loop immediately preceding it.

One or more nip rollers may be employed to ensure that the roller moving from the second to the first index member closes the open loop against preceding closed loops, i.e. it or they urge the cloth into contact with the other rollers carrying the cloth.

In one embodiment a reciprocating jockey roller may be employed in addition to the nip roller(s) for a similar purpose.

BRIEF DESCRIPTION OF THE DRAWINGS

The invention will now be described further by way of example only, with reference to the accompanying drawings, in which.

DESCRIPTION OF THE PREFERRED EMBODIMENTS

Figure 1:
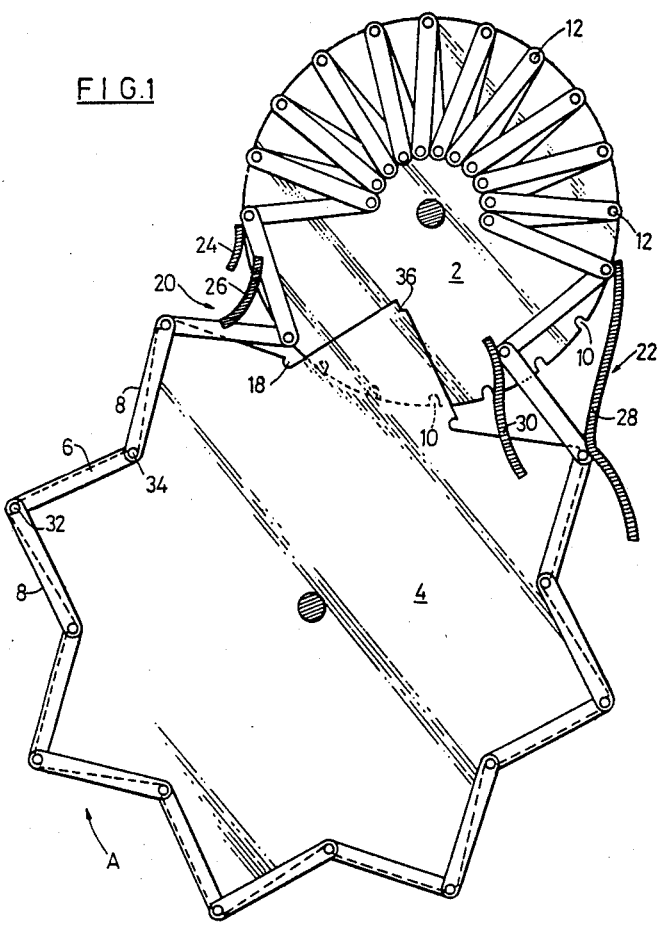
FIG. 1 is a plan view of a variable speed conveyor according to one aspect of the present invention.

Referring firstly to FIG. 1 there is shown variable speed conveyor apparatus. The apparatus comprises two index members 2,4 around which is entrained a chain formed by a plurality of pairs of links 6,8 to define an endless path. The two index members are driven in timed relation with the second member 4 rotating at a faster peripheral speed than the first member 2. The index member 2 has equally spaced circumferential recesses 10 and each recess is adapted to recieve a pin carried by one of the links 6, 8 or, as illustrated, by a pin 32 common to both links and serving additionally as a pivot pin for the pairs of links 6,8. The plurality of pairs of links are pivotally connected one with the another by a further pin 34. That is to say the leading link 6 is pivotally connected to the trailing link 8 by pin 32 which in turn is pivotally connected to another link 6 of the following pair by a pin 34.

As illustrated, the pins 32 are also adapted to be received in recesses 36 in the index member 4, whilst the pins 34 co-operate with recesses 18 in the member 4. The chain moves along the endless path in the direction of arrow A, clockwise as illustrated and the pairs of links transfer during their movement from the member 4 to the member 2 at an 'in feed' station 20, and from the member 2 to the member 4 at an 'off load' station 22. Respective pairs of guides 24,26; 28,30 are employed in the 'in feed' and 'off load' stations to control movement of the links 6,8. It will be seen that the first guides 24, 26 transfer the pins 32 one at a time from the second index member 4 to the first index member 2 and the second guides 28, 30 transfer the pins 32 one at a time from the first index member 2 to the second member 4. It will also be seen that the links are folded to lie adjacent to one another when on the index member 2 and are opened up when on the index member 4. The folding reduces the circumferential spacing between the respective pins 32 and thus for a given speed of rotation of the member 2, the member 4 has to rotate at a faster rate in order to present a pin 32 to the index member at each successive recess 10. This differential speed and the associated change in spacing enables the apparatus to have many useful applications.

For example, when the conveyor is used in an horizontal orientation as illustrated the links or the pivot pins 32 can serve as carriers for work pieces which have to have operations performed on them. For example, the member 2 can present the carriers to an oven for slow baking. The mechanism could form part of a chair lift or the like.

Alternatively the apparatus may be used vertially in combination with a second such apparatus as described further hereinbelow with reference to FIGS. 2 to 5.

Referring now to the drawings of FIGS. 2 to 5 there is illustrated, in simplified form, apparatus according to one aspect of the invention for forming a stack of plies of material. For convenience of illustration certain of the parts shown in FIG. 4 have to be separated in the axial direction from their actual axial positions.

The apparatus comprises a plurality of elongate rollers 1, commonly referred to in this application as festoon rollers, which are interconnected at each end by respective pairs of toggle links 3,5. Thus the links 3,5 are pivotally secured together at one end, and their other ends are arranged to carry adjacent rollers 1. Two pairs of rotatable index or catchment wheels 7,9 are provided. The catchment wheel 7 has a plurality of equally spaced peripheral recesses 11 which are dimensioned to receive shafts 1a projecting from opposite ends of the rollers 1. Thus, one catchment wheel of each pair is disposed at one side of the machine and the other on the opposite side of the machine, i.e. at opposite ends of the rollers 1. The wheels 7,9 are driven at differing peripheral speeds and their axes are offset substantially as illustrated. Axles 12,14 of the wheels 7 and 9 respectively are journalled for rotation in a frame 16 shown only in FIG. 4.

It will be appreciated by reference to FIG. 1, that the apparatus of FIGS. 2 to 5 incorporates two of the conveyor apparatus described in FIG. 1. The apparatus for stacking plies utilises the differential spacing of rollers carried by the chain links.

It will be seen that certain of the rollers are located on the catchment wheel 7 and others on the catchment wheel 9. The rollers disposed on the catchment wheel 7 control the off-feed of the plies or folds of material at the off-load station, indicated at 13. The catchment wheel 9 is star like in configuration and controls the movement of the rollers from the off-load station to the in-feed station generally indicated at 15. The peaks of the starwheel have notches 17 to receive the shafts projecting from the ends of the rollers 1, whilst the troughs have recesses 19 to receive pins 21 carried by the toggle links at the end where they are pivotally interconnected.

Figure 2:
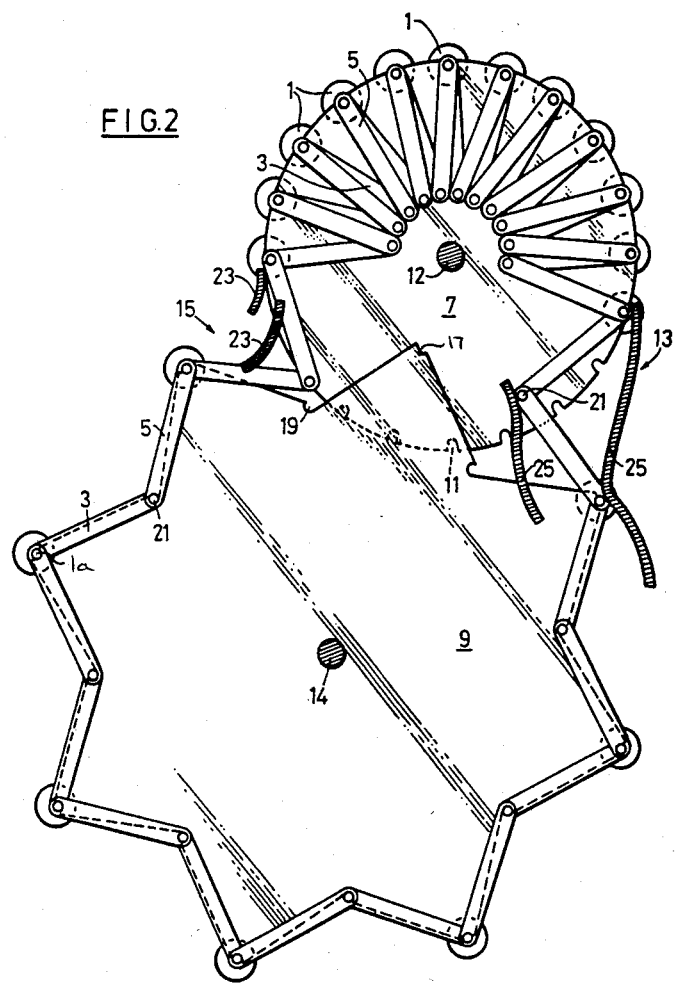
FIG. 2 is an end view of apparatus for arraying sheet material incorporating the apparatus of FIG. 1, on the line I—I of FIG. 4.
Figure 3:
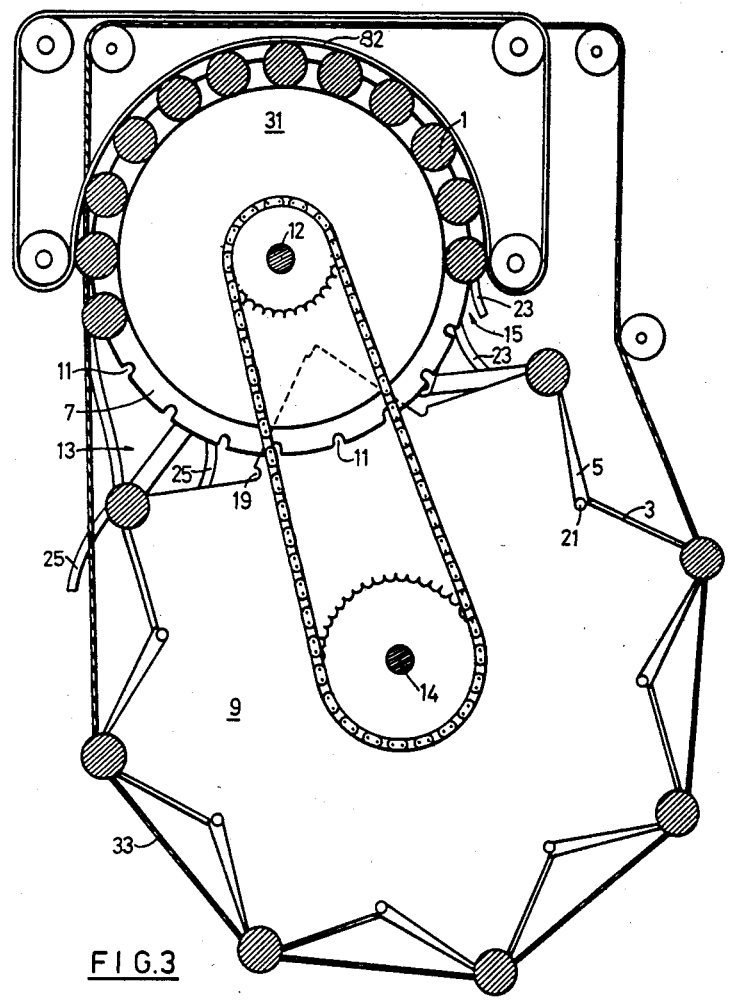
FIG. 3 is a view of the apparatus of FIG. 2 on line II—II of FIG. 4.
Figure 4:
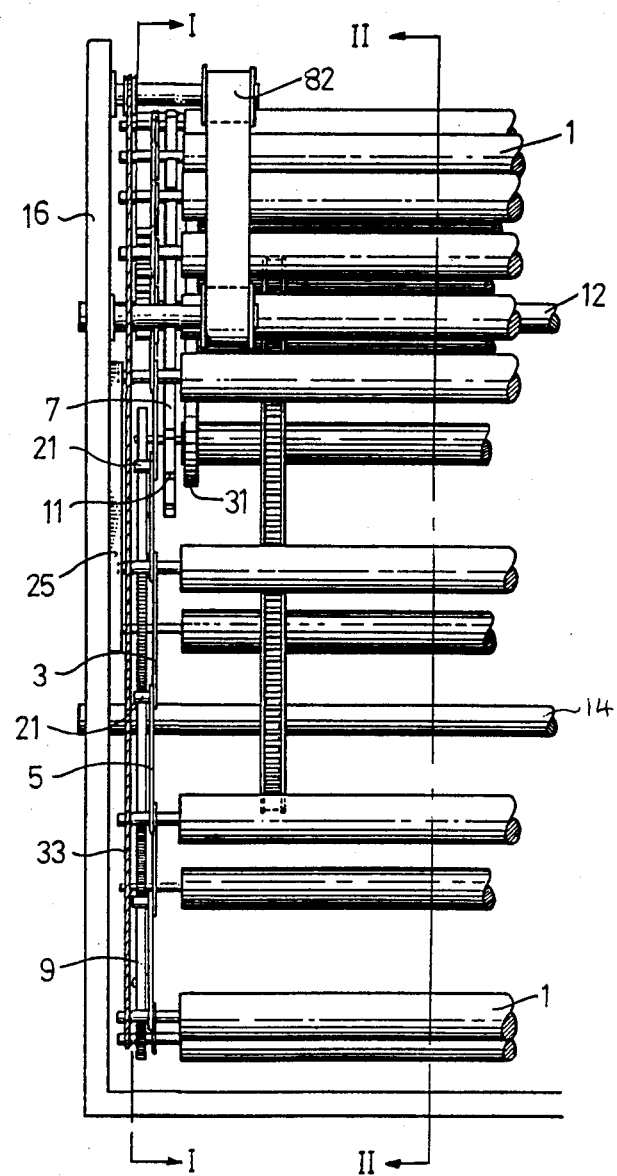
FIG. 4 is a front view of the left hand side of the apparatus of FIGS. 2 and 3.
Figure 5:
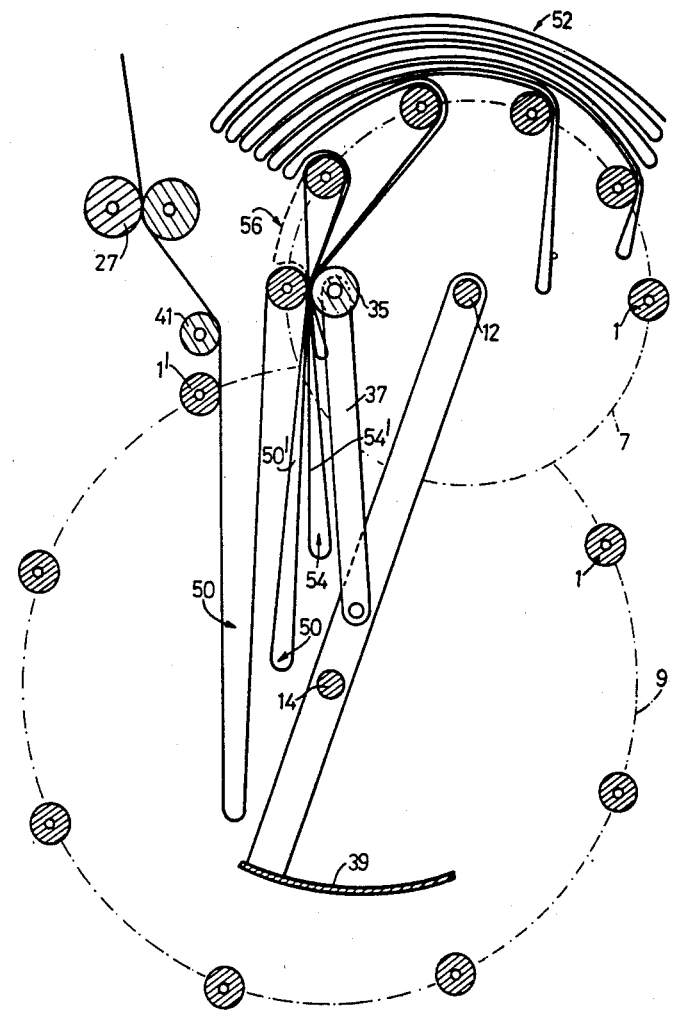
FIG. 5 is a diagrammatic sectional view showing the arraying action of the cloth on its passage through the apparatus of FIGS. 2, 3 and 4.

Respective first or in-feed and second or off-feed guides 23,25 are provided for controlling movement of the rollers between the two catchment wheels 7,9. A pair of feed rollers 27 are provided for feeding material to thereby festoon material between adjacent rollers 1. The rollers 1 move along an endless path in a clockwise direction as illustrated in the FIGS. 2 and 5. Means is provided for rotating the rollers about their own axes in a direction opposite to the general direction of movement of the rollers along the endless path. Conveniently, the means comprises a pair of wheels 31 which engage opposite ends of the rollers 1 and which are rotated in a clockwise direction as illustrated in FIGS. 2 and 5 to thereby cause the rollers to rotate in an anticlockwise direction. The wheel 31 is disposed co-axially with the catchment wheel 7. When the rollers leave the catchment wheel 7 and therefore no longer co-operate with the wheel 31, rotation ceases. As an alternative, an externally located endless band 82 may be arranged to contact the or certain of the rollers 1 carried by catchment wheel 7 and this band may be driven to thereby rotate the rollers. Such a band 82 may be employed to locate the rollers in the reesses in the catchment wheel 7. Preferably an endless band 33 is provided to pass around the circumference of the endless path in co-operating engagement with the rollers to hold them in position, especially during their conveyance on the catchment wheel 9.

In operation, referring to FIG. 5 which is simplified in that the number of rollers 1 has been reduced for ease of understanding, material is fed continuously from feed rollers 27 into the space defined within the rollers 1 on the catchment wheel 9 to form an open loop 50, and as the roller 1' immediately to the left of the in-fed material moves to the right it intercepts the material such that material is festooned over it forming a further downwardly depending loop. Preceding loops are fed out of the rollers, as described further hereinbelow, to form plies or folds of material 52 stacked one on top of the other, either directly or overlapping, externally of the rollers 1 carried on the catchment wheel 7. The speed of rotation of the rollers 1 about their axes relative to the forward movement of the rollers along the endless path is carefully adjusted so that either a stationary stack of superimposed plies are formed in the off load section or, alternatively, if overlapping plies are required for onward transmission and subsequent batch processing, then the mutual speed can be adjusted accordingly.

The rollers 1 are moved one at a time from the star-wheel 9 to the catchment wheel 7 by co-operating engagement between a pin carried by the respective toggle link 3 and the infeed guide 23 together with co-operation of the pins 21 with the notches in the star wheel. This co-operating engagement of pins causes the roller to move upwardly, after it has first closed up or compacted its loop 50 with previously compacted loops 54. Thus, an air pocket, substantially triangular in shape, is formed between the loops festooned over the upwardly moving roller and the previously displaced roller, which previously displaced roller is now rotating in a direction opposite to the direction of movement of the rollers along the endless path.

To further assist in the formation of this air pocket it is desirable to provide a nip roller 35 disposed inwardly of the compacted loops and preferably resiliently biased towards the roller undergoing its marked change in direction. The ply or fold of material 56 off loaded is formed from adjacent parts 50', 54' of two loops 50, 54 on adjacent rollers. Thus, the movement of the roller during the marked change in direction and in particular the upward movement thereof, up to and including commencement of rotation of that roller about its own axis is arranged to ensure that a new fold is formed in the desired position which will emerge under the previously formed plies. In the arrangement according to the present invention in which, the material from which the fold will form is trapped between loops of cloth which are moving upwardly. One loop is moving upwardly by virtue of the rotation of the roller on which it is formed about its own axis, whilst the other loop is carried by that roller which is undergoing the marked change in direction—upwardly at this point. Thus, the material is encouraged to move upwardly. Furthermore, because the roller which undergoes the marked change in direction has compressed its loop against other compressed loops prior to upward movement, an air pocket is formed which on upward movement of the roller has the effect of displacing the material outwardly thus forming the next fold to be off-loaded from the festoon rollers.

As the rollers are rotated about their axes and simultaneously moved along the endless path, the loops of material festooned thereover are progressively unloaded until such time as the roller is free, i.e., with no material festooned thereon or otherwise supported thereon. This position coincides with the position where the rollers are transferred from the catchment wheel 7 to the catchment wheel 9.

During movement of the rollers 1 on the catchment wheel 7, the toggle links 3,5 are approximately overlying each other, with the respective pairs of links between adjacent rollers disposed substantially radially. A pin carried by the link 5 engages in a perpheral notch in the catchment wheel 7 as an alternative to a shaft of the roller.

At the off-loading point, the pins carried by the links 3 cooperate with the off-loading guides 25 such that the rollers are moved controllably one at a time from the catchment wheel 7 to its recess in the catchment wheel 9. The toggle links 3,5 unfold during this operation and move into the position which they adopt during movement of the associated rollers on the catchment wheel 9. Thus, the pin 21 is received in the recess in the star wheel disposed between the adjacent rollers 1. Thus, the apparatus operates on a recirculating principle. The wheel 9 rotates at a faster peripheral speed than the wheel 7. Thus, at the region where the material is fed onto the rollers, the movement which closes up the loop to the previously formed loops is achieved quickly which is advantageous.

The nip roller 35 is preferably carried on the end of a pair of arms 37 which are pivotally mounted to a suitable mounting point, for example, a member which is located about the axes of the two catchment wheels. The member conveniently carries a scray 39 which prevents material of the loops from becoming entangled with the returning rollers carried by the catchment wheel 9. The arms 37 are preferably resiliently biased outwardly toward the loops of material and the roller undergoing the marked change in direction at its point of introduction into co-operating engagement with the recesses in the catchment wheel 7 at the end of its upwardly guided movement. The nip roller 35 urges the cloth toward the rollers 1. To give an improved action the nip roller may be in the form of an endless band trained around two end rollers, which band extends vertically a distance corresponding at least to the upward movement of the roller undergoing marked change in direction.

A slatted guide roller 41 is preferably provided as is a stop. The stop ensures that the material feeding into the endless band is caused to wrap around the roller which intecepts the loop of material. For this purpose the stop is positioned externally of the path of the roller and approximately vertically above the point at which the roller commences engagement with the guide 23.

A positioning arm is preferably provided to hold the ends of the formed plies of material away from the rollers which have just been subject to the marked change in direction. The free end of the arm carries a finger member for engaging beneath the ends of the plies resting on the rollers, and said arm is movable so as to describe a path which moves the finger member between a rest position wherein it supports the initially formed ends of the plies and a position in which it intercepts the roller path to engage the like end of the ply most recently formed.

For the purpose of batch treatment of the material it may be desirable to off-load the stack of plies from the apparatus either onto a conveyor belt located at the point where the rollers become free of the folded material or onto a curved guide picking up the ends of the plies may be provided to direct the material onto a conveyor belt. The material stack can be displaced onto the conveyor after a descrete length of material has been folded, for example by changing the relative speed of rotation of the rollers to the endless path of rollers so causing the stack to be transferred onto the conveyor. Where overlapping staggered plies are required, these can be fed continuously off the apparatus onto the conveyor, during continued folding of material fed into the apparatus. Such staggered overlapped plies may be rolled into a beam to render them easily transferble to next processing stage, for example an hydro-extractor.

Figure 6:
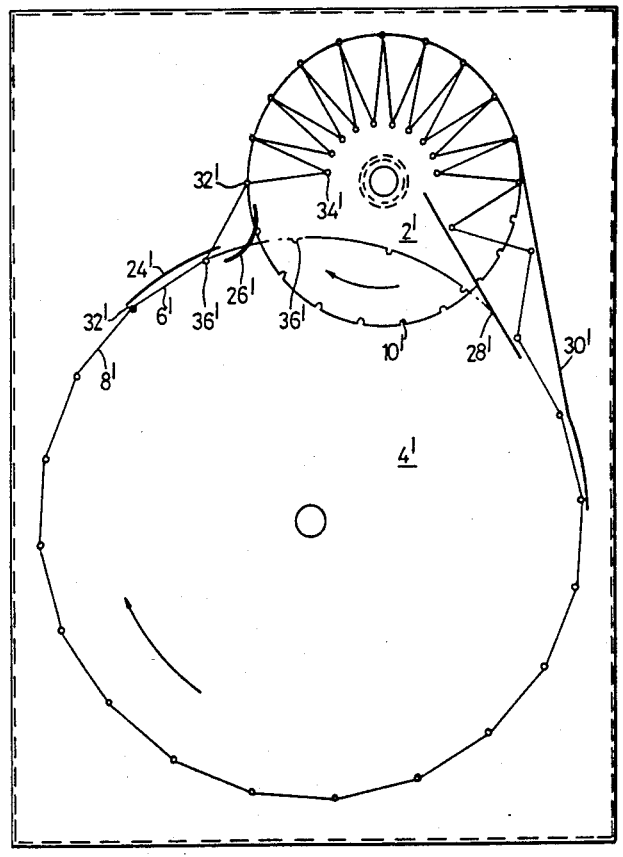
FIG. 6 is a plan view of another embodiment of variable speed conveyor according to the present invention.

Referring now to FIG. 6 there is illustrated another embodiment of variable speed conveyor apparatus. The appartaus is essentially the same as that described with reference to FIG. 1 but differs in that the index members 2',4' are both in the form of sprocket wheels with circumferential recesses 10' and 36'. An endless chain if formed by a plurality of pairs of links 6', 8' and the pins 32',34' interconnecting the respective links are received in the recesses 36' of the index member 4' and the recess 10' of the member 2' as the links pass around the two members. Thus, the links 6',8' are unfolded ever further when on the index member 4'. The guides 24',26' at the in-feed station and the guides 28',30' at the off-feed station are of revised configuration to control the movement of the links as required to achieve controlled transfer. The index member 4' is geared to rotate at approximately four times the speed of member 2'. The operation of the guides and folding of the links is similar to that described hereinafter with reference to FIG. 7. Thus, the pins 32' are brought on at a time into engagement with the guide 26' which causes the pin to move upwardly and into engagement with the next vacant recess 10' in the index member 2'. The pin 34' does not engage with the guide 26' and so folding of the links is controlled by the movement of the adjacent pins 32'. After approximately 180° of rotation the links are transferred one pair at a time to the index member 4' with the pins disengaging the recess 10' and being guided by the guide 30', whilst the pins 34' are guided by the guide 28'. The pins are thus caught up in the successive recesses 36' of the index member 4'.

Figure 7:
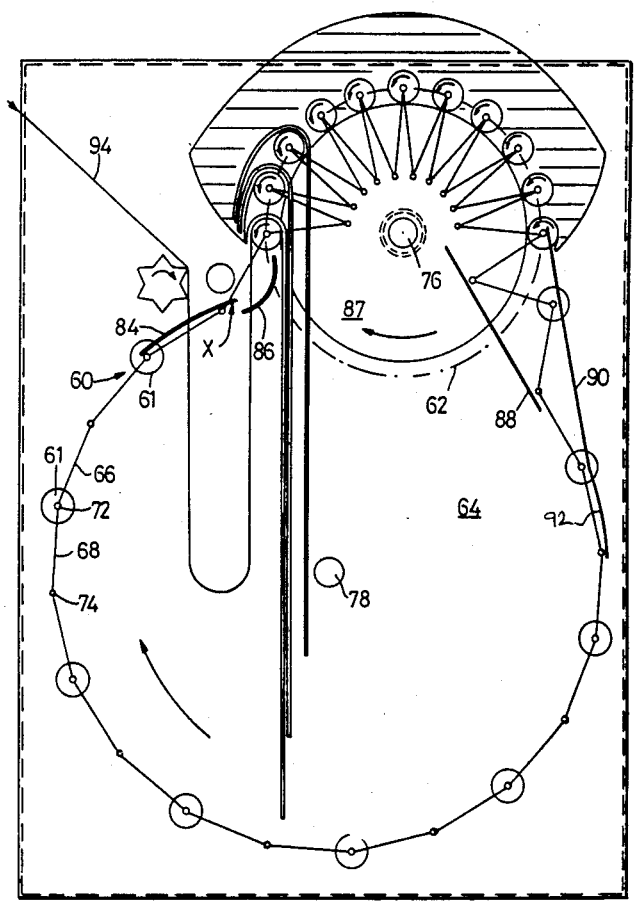
FIG. 7 is a simplified end view of apparatus for arraying sheet material incorporating the apparatus of FIG. 6.
Figure 8:
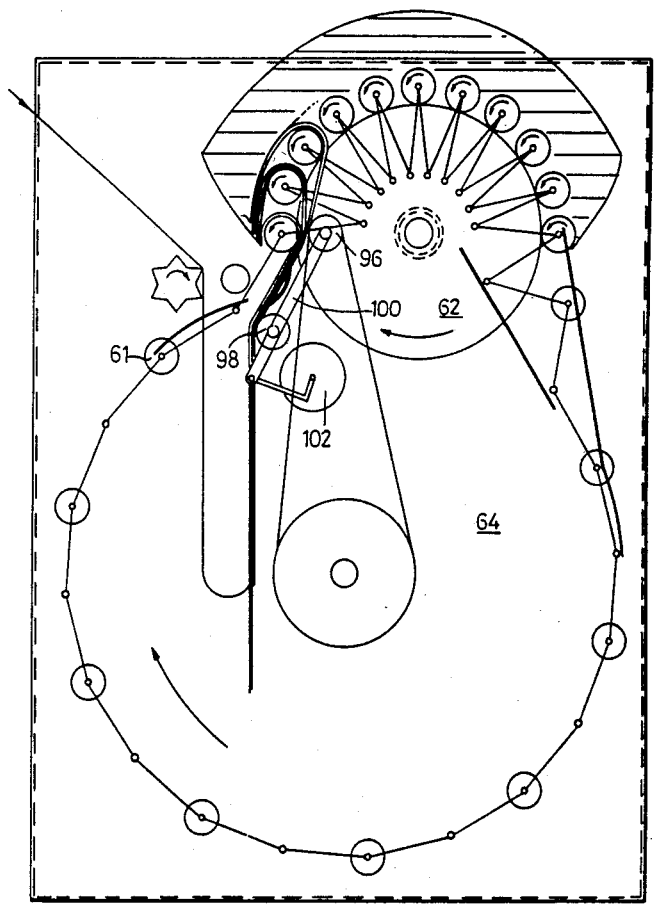
FIG. 8 is similar to FIG. 7 with additional nip rollers.

The apparatus of FIG. 6 may be utilised in an apparatus for folding material into plies similar to that illustrated in FIGS. 2 to 5 and reference is had to FIGS. 7 and 8 which illustrate in simplified form suitable apparatus.

Referring now to FIG. 7 there is shown a side view of an apparatus for folding sheet material into plies which utilises the conveyor apparatus of FIG. 6.

The apparatus is similar in construction to the embodiment of FIGS. 2 to 5 in that two spaced apart endless chains 60 are provided and these are interconnected by elongate horizontal rollers 61. Each chain 60 is made up of pairs of links 66,68 which are pivotally interconnected one with another by pins 72, 74. The pins 72 connect the leading links 66 to the trailing link 68, whilst the pins 74 connect the trailing link 68 to the leading link 66 of the next pair of links in the chain. The pin 72 may also constitute the axle for the rollers 61 which is journalled for rotation about the axis of the pin 72. Two index members 62 and 64 are provided and which define a path around which the chains 60 are entrained. The respective members are rotatable about respective shafts 76,78, and the members are driven in synchronism with the member 62 rotating at approximately one quarter of the speed of member 64, member 64 being larger in diameter. Member 62 is shown in dotted lines.

The index members 62 and 64 have respective recesses (not shown) in their outer periphery. The recesses in the member 62 receive the pins 72 whilst the recesses in the index member 64 receive alternately the pins 72 and 74. The links 66,68 are folded to lie adjacent to one another when on the index member 62 and are unfolded to lie approximately 180° apart when on the index member 64.

Movement of the rollers from the index member 64 to the index member 62 is controlled by movement of the links 66,68 where movement is controlled by two guides 84,86. The guide is generally concave and serves to retain the pins 72,74 in the recesses up to the point X where the guide terminates at which point the pin 72 is brought into co-operating engagement with the guide 86 which causes it to move upwardly along the guide to be caught up by the next vacant recess 82 in the index member 62. During this upward movement the pin 74 is caused to move out of the recess 80 and a folding action of the links occurs. It will be appreciated that by making the pin 72 longer than the pin 74 only the former pin contacts the guide 86. The mechanism described so far corresponds to the mechanism of FIG. 6.

As the links engage in the recess of the index member 62, the roller 61 carried by the link is brought into co-operating engagement with a wheel 87 which is rotated independently of the index member 62. The rollers 61 are thus caused to rotate in an anti-clockwise direction as illustrated, i.e. in a direction opposite to the direction of movement of the rollers around the endless path. The rollers remain in contact with the wheel 87 with the pins 72 engaging the index member 62 for approximately 180° when they come to an 'off-load' station where guides 88,90 control movement of the links to guide them onto the index member 64. The guides 88,90 are substantially straight and converge towards one another in the direction of movement of the endless path. The guide 90 terminates with a concave part 92 which serves to hold the pins in the recesses on the index member 64.

FIG. 7 illustrates how sheet material 94 such as cloth is fed between successive rollers and caused to form a loop over the rollers. That is to say the roller 61' as it moves to the right, intercepts the material 94 so that the material is caused to drape over the roller forming a loop between successive rollers. As soon as the roller engages the wheel 87 and commences to rotate, the loop of material is fed out of the rollers to be deposited as a ply on top of the rollers and beneath previously formed plies. The material is progressively fed out of the rollers as they move round the endless path.

To assist in the formation of a loop which is fed out of the rollers, further nip and jockey rollers may be provided as illustrated in FIG. 8. A first nip roller 96 is provided which is rotatably driven in a clockwise direction as illustated. The loops of material are trapped between the nip roller 96 and one of the rollers 61 on the index member 62. A jockey roller 98 is provided to intercept with the material as the roller 61 approaches the guide 86. The jockey roller 98 is mounted on a bar 100 which is reciprocated by a crank 102 so that the jockey roller 98 only contacts the roller 61 for a short period and so only traps the material therebetween for a short period, but sufficiently to encourage formation of a loop and air pocket for out feeding of the ply of material.

The principle of operation is otherwise similar to the apparatus described with reference to FIGS. 2 to 5 but in comparison therewith, the cloth is compacted mechanically over a longer area by rollers 96 and 98 and provides the length of motion to form a large enough air pocket to ensure the correct formation of a loop. Preferably, all the rollers 96,96,102 are driven. The ratio between 98 and 96 is 5:1, the ratio between 102 and 96 is 2:1. That is to say roller 98 moves towards the centre as roller 61 compacts the newly formed loop to avoid jerking the cloth.

I claim:

1. A conveyor apparatus comprising a plurality of pairs of links which are pivotally interconnected one with the other and which define an endless chain, first and second index members, means carried by at least one link of each pair of links providing co-operating engagement with the first and second index members, the first and second index members defining an endless path along which the links are movable, and means for driving the first and second index members in timed relation such that the peripheral speed of the first index member is less than the peripheral speed of the second index member, and first and second guide means to control movement of the links respectively from the second index member to the first index member, and from the latter to the former during movement around the endless path, said first and second guide means being such that said means providing co-operating engagement are transferred one at a time from the second index member to the first index member and one at a time from the first index member to the second index member, the differential peripheral speeds of the first and second index members resulting in the links moving at differing speeds when on each of the two index members.

2. A conveyor apparatus according to claim 1 wherein the first and second index members are rotatably driven and are in the form of wheels with circumferentially spaced recesses for receiving pins interconnecting the links of the chain to provide said co-operating engagement.

3. A conveyor apparatus according to claim 2 wherein the first and second guide means for controlling movement of the links between the index members engage with said pins projecting from the links and the first and second guide means control folding and unfolding of the links on their passage between the two index members such that the links are arranged to be folded when on the first index member, with the ends of adjacent pairs of links lying adjacent one another and the links lying substantially side by side, and at least partially unfolded when on the second index member.

4. A conveyor apparatus according to claim 3 wherein a further guide is employed to retain the pins in contact with the index members.

5. A conveyor apparatus according to claim 1 comprising a further endless chain made up of a plurality of pairs of links and movable on an endless path formed by two further index members, wherein the two endless chains are disposed in spaced apart relation with a pair of links from each chain being interconnected by a respective carrier member, each carrier member comprising a roller which is rotatable, and whose opposite ends form a pivotal connection for a respective pair of links from each chain.

6. A conveyor apparatus according to claim 5 wherein said rollers are rotated in a direction opposite to the direction of movement of the rollers around the endless path by co-operating drive means.

7. Apparatus for arranging sheet material into a series of superimposed plies or folds, comprising a plurality of mutually spaced horizontal, elongate rollers arranged to describe an endless path, means carrying the rollers on said endless path comprising spaced apart chains defined by pairs of links connected one with another, and respective first and second index members which are rotatable in synchronism at different speeds and around which the chains are entrained and co-operate, and guide means for transferring the rollers between the index members at respective 'in feed' and 'off load' stations, which guide means control the folding and unfolding of the links carrying the rollers, whereby the roller being transferred from the second to first index member at the 'in feed' station undergoes a marked change in direction and closes on the roller which had preceded it through the marked change in direction, means for rotating at least some of the rollers on the first index member in a direction opposite to the direction of movement of the rollers on the endless path after the roller has undergone the marked change of direction, which change in direction and the rotation of the rollers acts to control an air pocket formed between the layer of material about to be made into a loop and a previously formed ply to help make this loop, by closing each open loop, and feeding the closed loops successively out from the roller path and deposting each said loop outside the path of the rollers beneath the loop immediately preceding it.

8. Apparatus according to claim 7 wherein at least one nip roller is disposed within the endless path of rollers and urged therearound, said nip roller being employed to ensure that the roller moving from the second to the first index member closes the open loop against preceding closed loops.

9. Apparatus according to claim 7 wherein said pairs of links are pivotally interconnected one with the other by pins and wherein alternate pins are co-operable with the guide means at the in feed station to control location of the rollers onto the first index member.

* * * * *